United States Patent [19]

Coombs

[11] 4,333,288
[45] Jun. 8, 1982

[54] BEVELED EDGE TRIM

[76] Inventor: Donald W. Coombs, 8191 E. Helen St., Tucson, Ariz. 85715

[21] Appl. No.: 81,478

[22] Filed: Oct. 3, 1979

[51] Int. Cl.³ .............................................. B32B 3/02
[52] U.S. Cl. ...................................... 52/312; 52/811; 144/346; 428/81
[58] Field of Search ................. 52/311, 316, 312, 813, 52/631, 820, 280, 281, 811, 783, 784; 144/309 R, 309 W, 316, 314 A; 428/81, 192; 312/140.3, 140.4

[56] References Cited

U.S. PATENT DOCUMENTS

| | | | |
|---|---|---|---|
| 2,391,052 | 12/1945 | Hauptli | 52/316 |
| 3,212,541 | 10/1965 | Burrows et al. | 144/134 D |
| 4,083,160 | 4/1978 | MacDonald | 52/811 |

Primary Examiner—John E. Murtagh
Attorney, Agent, or Firm—Cahill, Sutton & Thomas

[57] ABSTRACT

A beveled edge trim structure for counters, such as kitchen counters, includes a beveled inlay groove cut along an edge of the counter. A laminate inlay strip is adhesively bonded in the inlay groove. A first router tool includes guide surfaces which guide a first high speed cutting element along straight and rounded edges of the counter, cutting beveled inlay grooves along the edges. For right angle corners, a jig is attached to a partially installed inlay strip after alignment of a pair of inclined guide edges of the jig with corresponding inclined end edges of the beveled inlay groove. A second routing tool is guided along the inclined guide edges of the jig, cutting a beveled pointed end on the inlay strip. The beveled pointed end is aligned with the corresponding edges of the corner inlay groove.

6 Claims, 22 Drawing Figures

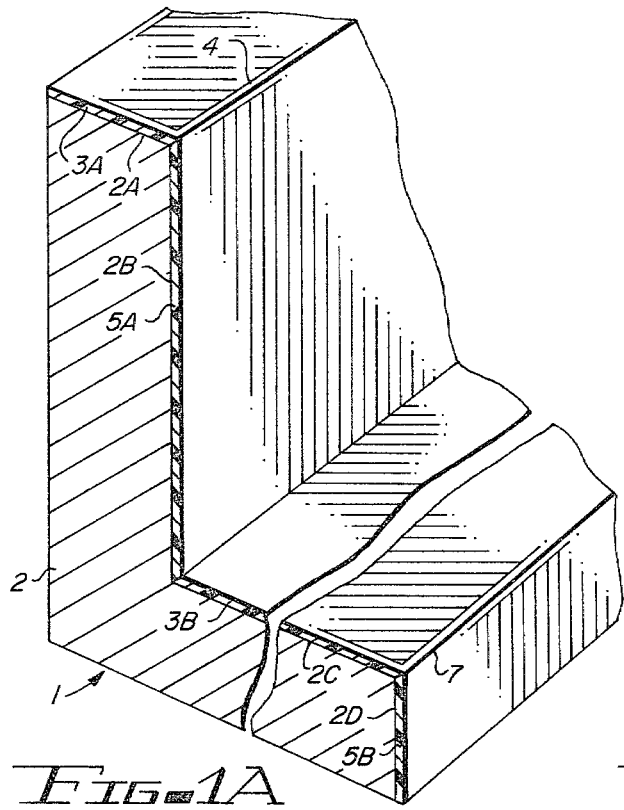
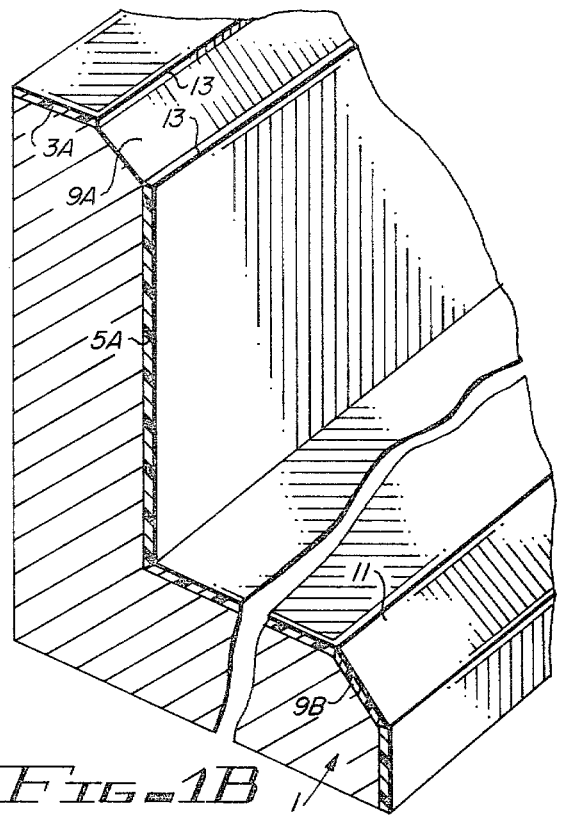
FIG-1A    FIG-1B
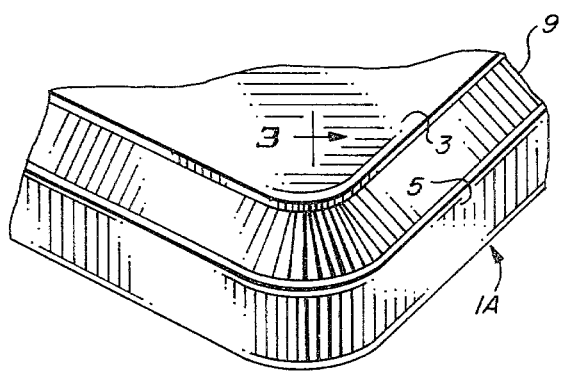
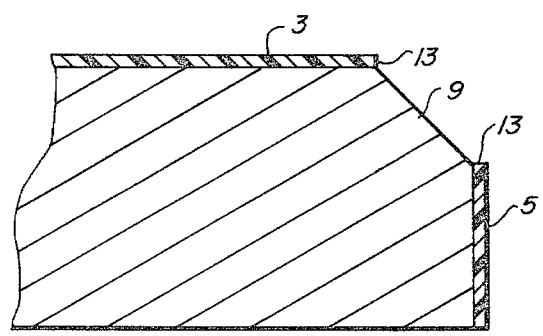
FIG-2    FIG-3
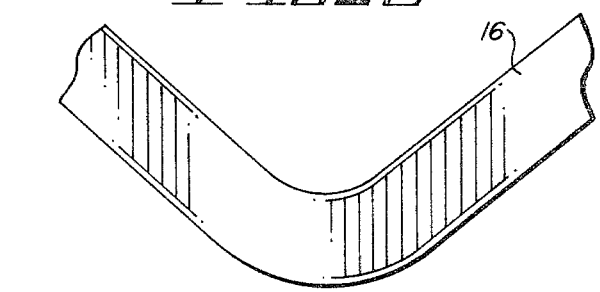
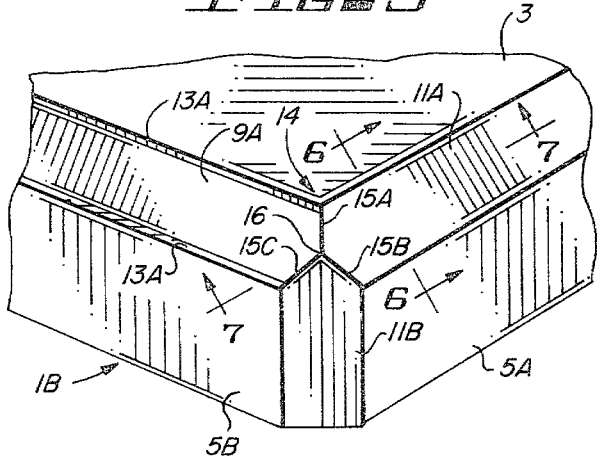
FIG-4
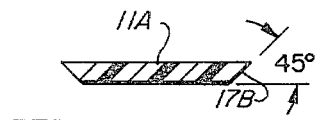
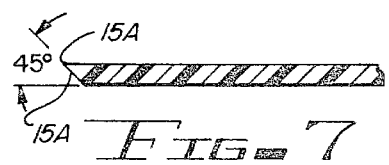
FIG-6    FIG-7    FIG-5

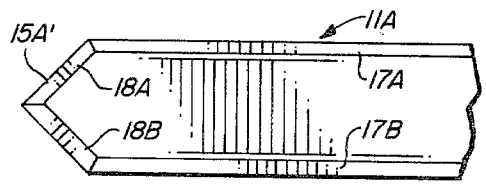
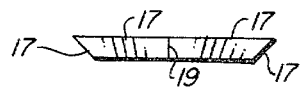
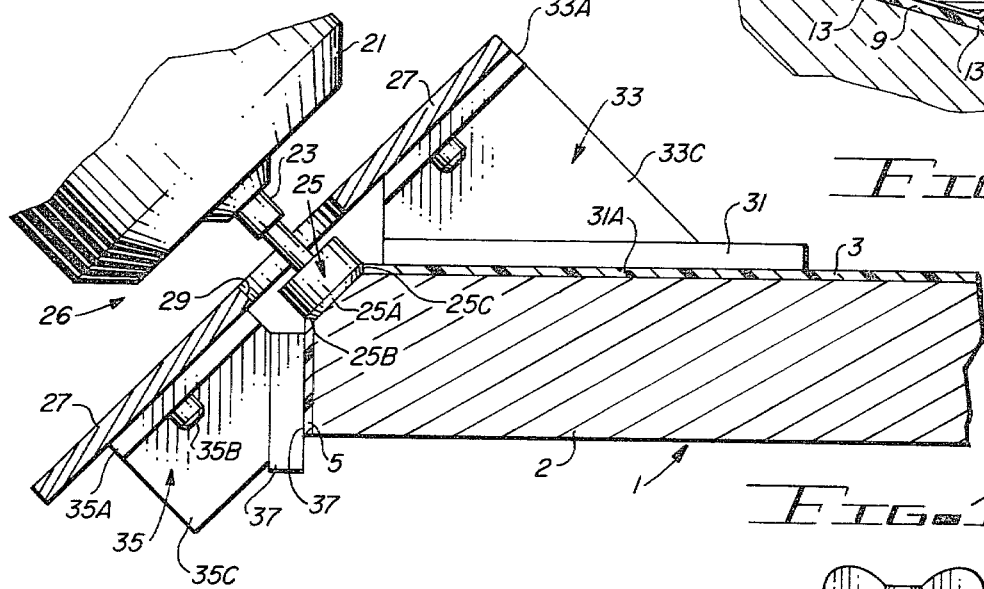
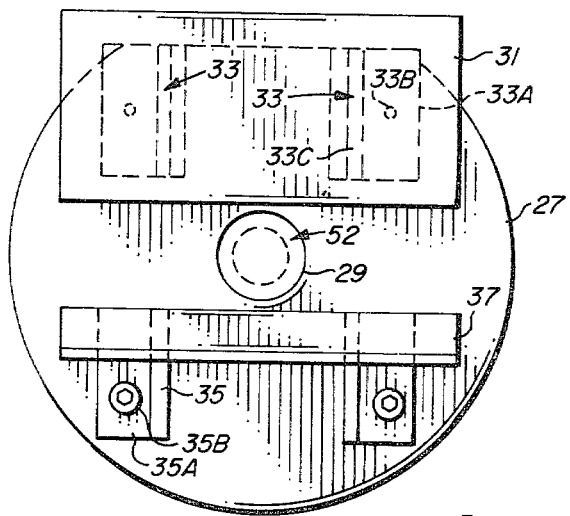
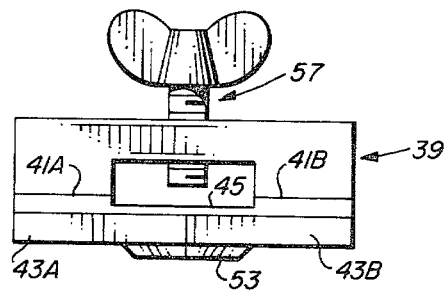
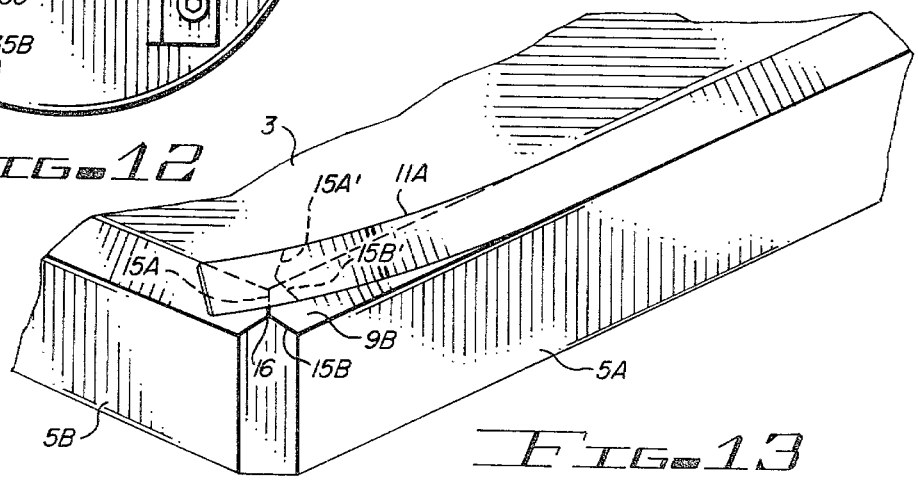

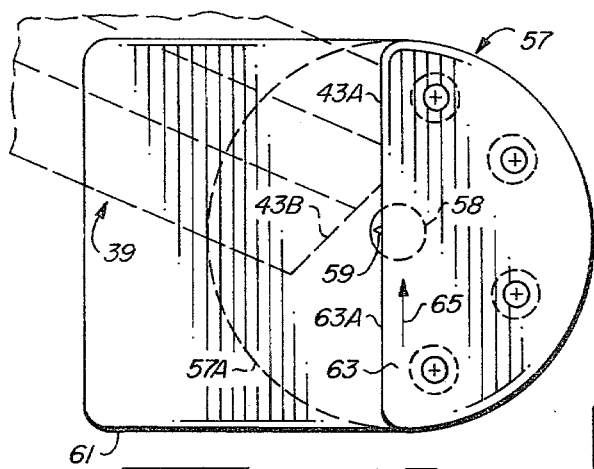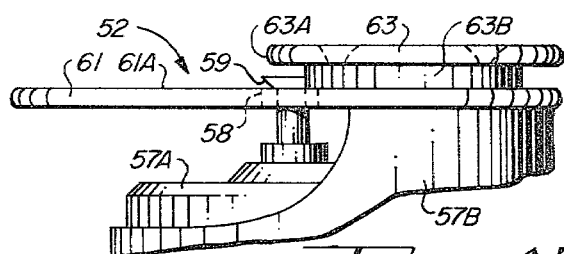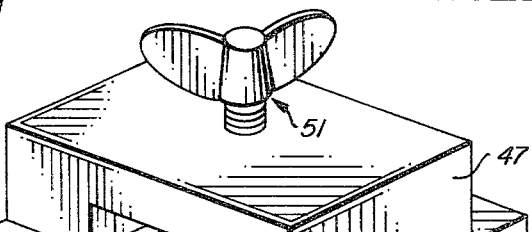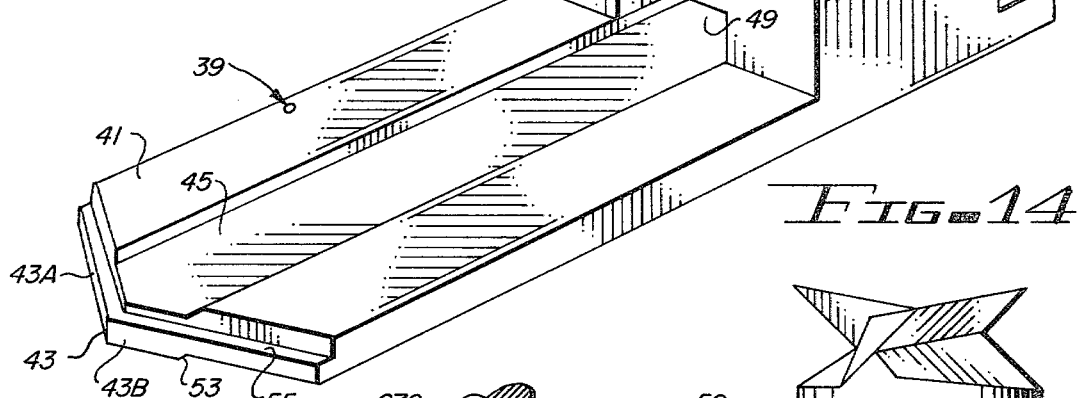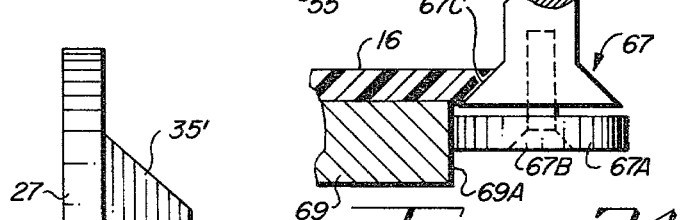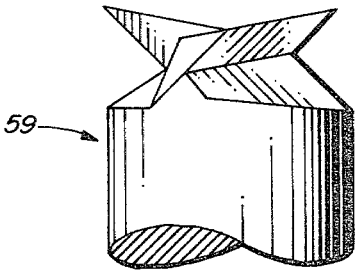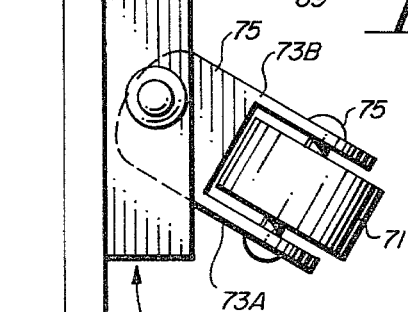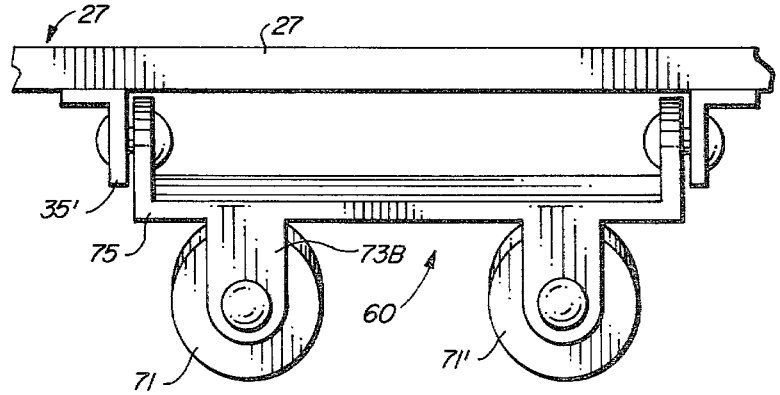

BEVELED EDGE TRIM

BACKGROUND OF THE INVENTION

1. Field of the Invention

The invention relates to edge trim structures for counters having top and edge surfaces of high pressure laminate material, such as that sold under the trademark FORMICA, and also to methods and apparatus for installing such edge trim.

2. Description of the Prior Art

High pressure laminate materials are commonly used for kitchen counter tops and other furniture, both for the horizontal top surfaces and the vertical edge surfaces. Right angle corners are frequently formed by the intersections of mutually perpendicular top surface and edge surfaces. Rounded corners are formed by the intersection of a curved top surface and a continuous edge surface which is perpendicular to the top surface.

The joining edges of the laminate layer of which the horizontal top surface and vertical edge surface are formed are usually beveled at 45°, so that the beveled edges joins to form a sharp right angled edge along the entire edge of the counter. This edge is easily damaged, due to the brittleness of the laminate material. Further, sharp corners occasionally cause injury to persons who bump into them. It would be desirable to have an attractive edge trim for counters having laminate material surfaces which does not present a sharp edge.

Accordingly, it is an object of the invention to provide an attractive edge trim for counters and furniture, especially counters and furniture having laminate material surfaces.

Another object of the invention is to provide an attractive edge trim which blends very well with laminate material, such as FORMICA, used on horizontal top and vertical edge surfaces of a counter top.

Although various routing devices are known for producing beveled cuts along edges of flat surfaced wooden objects, such as furniture and the like, no known prior bevel cutting device is capable of precisely and economically producing bevel cuts which would be attractive along edges of counter tops and other furniture surfaces having high pressure laminate surface material. A novelty search directed to the present invention uncovered U.S. Pat. Nos. 2,839,107, 2,756,785, 2,920,663, 3,241,453 and 4,133,361, none of which disclose devices capable of making or installing the needed laminate edge trim.

Another object of the invention is to provide bevel cutting apparatus suitable for installing an attractive beveled edge trim along edges of a counter having horizontal top and vertical edge laminate surfaces and straight and/or rounded corners.

SUMMARY OF THE INVENTION

Briefly described, and in accordance with one embodiment thereof, the invention includes a beveled trim structure for laminate surfaced countertops and a method and apparatus for making the beveled trim structure. The method for making the beveled edge trim for laminate surfaced kitchen counters and the like includes utilization of a first routing tool having a first high-speed cutting element which has a flat cutting edge perpendicular to the axis of rotation and of the cutting element and a pair of opposed cutting edges, each inclined 45 degrees with respect to the axis of rotation. A first guide surface rigidly attached to the first routing tool for contacting and moving along the upper surface of a counter is attached to the first routing tool at a 45° angle to the axis of rotation. A second guide surface for moving along the vertical edge of the counter is also attached to the first router tool. In use, the first router tool is guided along an edge of the counter, cutting an inlay groove having a bottom surface inclined approximately 45° with respect to the horizontal top and vertical edge surfaces of the counter. The opposed sides of the inlay groove are beveled to be outwardly inclined at approximately 45° with respect to the bottom of the inlay groove. An inlay strip, also formed of laminate material, having a thickness equal to the depth of the inlay groove has opposed beveled edges inclined by approximately 45 degrees to align with the corresponding beveled edges of the inlay groove. The inlay strip is glued into the inlay groove, except for an end section adjacent to a corner of the counter top. A jig having a bottom ridge which mates with the inlay groove and a top groove into which the free end of the inlay strip precisely fits is slid under the free end of the inlay strip. An end of the jig is pointed, having two end edges which are each inclined 45° with respect to a longitudinal axis of the inlay strip. A second router tool having a second high-speed cutting element and a guide which cooperates with the inclined end edges of the jig is guided along the inclined end edges of the jig, producing a precise pointed, beveled end on the free end of the inlay strip. The jig is then removed, glue is applied to the bottom surfaces of the inlay groove and/or inlay strip. The inlay strip then is pressed into the groove, its pointed end being perfectly aligned with the pointed end of the inlay groove. In one embodiment of the invention, the first and second guide surfaces of the first router tool are flat surfaces which are perpendicular to each other. This device is useful for beveling counters with sharp corners. In another embodiment of the invention, the second guide surface includes the cylindrical surfaces of a pair of spaced rollers, the cylindrical surfaces being perpendicular to the first guide surface. The rollers are spaced in balanced relationship about the axis of rotation of the first high speed cutting element. The latter embodiment of the invention is useful in cutting beveled or inclined inlay grooves along rounder corners of a counter top. A laminate inlay strip to fit in such beveled inlay grooves around rounded corners is cut by means of a high-speed cutting element having a 45° cutting edge and a rotatable end wheel which guides the cutting bit along a curved guide surface of a curved template.

BRIEF DESCRIPTION OF THE DRAWINGS

FIG. 1A discloses a partial perspective view of a counter surface before installation of edge trim in accordance with the present invention.

FIG. 1B is a partial perspective view of the counter surface of FIG. 1A after cutting of two beveled inlay grooves therein and installation of an inlay strip in one of the grooves.

FIG. 2 discloses a beveled inlay groove formed in a rounded counter corner.

FIG. 3 is a section view taken along section lines 3—3 of FIG. 2.

FIG. 4 is a plan view of a curved inlay strip to be inlaid in the inlay groove of FIG. 2.

FIG. 5 is a perspective view of a counter corner with beveled inlay grooves cut along the three edges thereof, two of the beveled inlay grooves being filled with mating inlay strips of laminate material.

FIG. 6 is a sectional view taken along section lines 6—6 of FIG. 5.

FIG. 7 is a sectional view taken along section lines 7—7 of FIG. 5.

FIG. 8 is a bottom view of the pointed end of an inlay strip utilized to fill the inlay grooves of FIG. 5.

FIG. 9 is a front view of the inlay strip of FIG. 8.

FIG. 10 discloses a non-beveled laminate inlay strip disposed in the top surface of a laminate surfaced counter.

FIG. 11 is a side view of a routing apparatus utilized to cut the beveled inlay grooves of FIG. 1B and FIG. 5.

FIG. 12 is a partial end view of the apparatus of FIG. 11.

FIG. 13 is a partial perspective view useful in illustrating the method of aligning and cutting ends of laminate inlay strips for the embodiment of the invention shown in FIG. 5.

FIG. 14 is a perspective top view of a jig used in cutting the pointed ends of beveled inlay laminate strips for the embodiment of the invention shown in FIG. 5.

FIG. 15 is a front view of the jig of FIG. 14.

FIG. 16 is a bottom view of a routing apparatus used in conjunction with the jig of FIG. 14 to cut the pointed ends of the laminate inlay strips of the embodiment of the invention shown in FIG. 5.

FIG. 17 is a partial side view of the routing device of FIG. 16.

FIG. 18 is a partial side view of a high speed cutter element utilized in the routing device of FIG. 16.

FIG. 19 is a partial side view of a guide element utilized in an alternate embodiment of the apparatus shown in FIG. 1 useful in cutting beveled inlay grooves along both straight edges and rounded corners.

FIG. 20 is a side view of a guide element shown in FIG. 19.

FIG. 21 is a side view illustrating use of a high speed bevel edged cutter having a bevel wheel for guiding the cutting edge along a template surface.

DESCRIPTION OF THE INVENTION

Referring now to FIG. 1, a partial perspective section view of a typical countertop 1 is shown wherein the respective horizontal and vertical outer surfaces of wooden substructure 2 are covered by flat layers of high pressure laminate material, such as FORMICA. Such high pressure laminate material hereinafter is referred to as simply "laminate" or "laminate material".

More particularly, laminate layer 3A is glued or adhesively attached to horizontal surface 2A of wooden substructure 2. Similarly, laminate layer 5A is attached to vertical substructure 2B. Laminate layer 3 is glued to substructure surface 2C, and laminate layer 5 is glued to substructure surface 2D. The joining edges of laminate layers 3A and 5A are beveled at a 45° angle, producing edge 4. Similarly, laminate layers 3B and 5B are joined at edge 7.

In accordance with the present invention, beveled inlay grooves, such as 9A and 9B in FIG. 1B, are cut (by means of the routing device of FIG. 8, subsequently described). The bottoms of beveled inlay grooves 9A and 9B are formed at 45 degree angles to the horizontal and vertical laminate layers 3A and 5A, and are referred to as "beveled" inlay grooves because their bottom surfaces are beveled or inclined with respect to top and side laminate layers 3A and 3B. Each inlay groove has two edges 13 which are inclined at angles of 45° with respect to the bottom surface of that inlay groove.

Still referring to FIG. 1B, an inlay strip 11 of laminate material is adhesively attached to inlay groove 9B. Inlay strip 11 is made of suitable laminate material which either may be identical in appearance to material of laminate layers 3A and 5A, etc., or may have a different finish or color. The thickness of inlay groove 11 is precisely the same as the thickness of laminate layers 5A, etc. The edges of inlay strip 11 are beveled at 45° with respect to the major surfaces thereof; the width of inlay strip 11 is such that it fits perfectly in inlay groove 9B. Similarly, an identical laminate strip can be adhesively attached in inlay groove 9A. The result is a very pleasing edge trim which is perfectly matched with the exterior finish of laminate layers 3A, 5A, etc. Further, the sharp edges, such as 4 and 7 in FIG. 1A, are eliminated; unsightly chipping of such sharp edges is eliminated.

Referring now to FIG. 2, a countertop corner 1A having a rounded corner configuration is shown. A beveled inlay groove 9, entirely similar to beveled inlay grooves 9A and 9B of FIG. 1B, is shown extending along the straight edges of countertop 1A and around rounded corner 12. Beveled inlay groove 9 of FIG. 2 can be produced by means of an embodiment of the apparatus of the invention shown in FIGS. 19 and 20, subsequently described.

The precise configuration of the beveled inlay grooves of FIGS. 1B, 2 and 5 is best shown in FIG. 3, which is a sectional view taken along section lines 3—3 of FIG. 2. Referring to FIG. 2, it is seen that the bottom of beveled inlay groove 9 is inclined at a 45° angle with respect to laminate layers 3 and 5. Beveled inlay groove 9 has one edge 13 which is perpendicular to the outer surface of laminate layer 3 and a second edge 13 which is perpendicular to the outer surface of laminate layer 5.

FIG. 4 discloses a top view of a laminate inlay strip cut to fit around the rounded corner portion of beveled inlay groove 9 in FIG. 2. The edges of laminate strip 16 of FIG. 4 are beveled along the lower surface (not shown) at 45° angles to the major surfaces of laminate strip 16. Inlay strip 16 is placed in and aligned with rounded portion 12 of beveled inlay groove 9 after a suitable adhesive material has been applied along the bottom of beveled inlay groove 9. Laminate strip 16 is then pressed into beveled inlay groove 9, forming a precise fit therewith.

Referring now to FIG. 5, a non-rounded corner configuration for beveled inlay grooves and inlay strips fitting therein is shown. Countertop section 1B includes three beveled inlay grooves 9, including inlay groove 9A, which does not yet have an inlay strip therein. The two other inlay grooves shown in FIG. 5 have inlay strips 11A and 11B disposed respectively therein. The three inlay grooves of FIG. 5 are formed along the three edges leading to corner 14. All have bottom surfaces inclined at 45° with respect to the contiguous flat laminate surface layers. Consequently, all three have pointed ends meeting at point 16, and all three pointed ends are formed by edges which make 45° angles with the side edges of the three respective inlay grooves.

The structure of the inlay strips, such as 11A, is readily seen in FIGS. 6 and 7, which are section views of inlay strip 11A taken along section lines 6—6 and 7—7 of FIG. 5. In FIG. 6, it is seen that inlay strip 11A has its side edges 17A and 17B beveled at 45 degree angles with respect to the major surfaces of inlay strip A. As seen in FIG. 7, the edges of the pointed end of inlay strip 11A are also inclined at 45 degrees, forming a keel line 15A'.

FIG. 8 shows the bottom view of inlay strip 11A, clearly illustrating the beveled side edges 17A and 17B and keel line 15A' of FIG. 7. An end view of the pointed end of inlay strip 11A is shown in FIG. 9.

In FIG. 10 an alternate embodiment of the invention is shown wherein an inlay strip 11 is disposed within an inlay groove 9 having 45 degree inclined side edges 13 disposed midway in flat laminate surface 3, rather than along a corner thereof.

Referring now to FIG. 11, routing apparatus 26 is utilized for cutting the 45 degree beveled inlay grooves described above. The beveled inlay grooves are cut by means of a high speed cutter 25 which rotates at very high speed by means of a shaft connected to chuck 23 of router motor 21. (Router motor 21 can be the motor of any of a number of conventional commercially available high-speed routers). High speed cutter 25 has a straight cutting edge 25A which is perpendicular to the axis of rotation of cutter 25. Edge 25A thus cuts the flat bottom surfaces of the above described inlay grooves. Edges 25B and 25C are symmetrically spaced from the axis of rotation, and are inclined at 45 degree angles with respect to edge 25A. Edges 25B and 25C produce beveled cut edges 13 in FIG. 1B of beveled inlay grooves 9A.

Routing apparatus 26 is utilized to cut inlay grooves in a pre-existing countertop 1 having horizontal laminate surface 3 and vertical laminate surface 5. A base plate 27 has an aperture 29 therein through which the shaft of high speed cutter 25 extends. Base plate 27 is rigidly connected to the housing of router motor 21. A first guide plate 31 having a smooth, flat guide surface 31A for sliding along the upper surface of laminate layer 3 is rigidly attached to base plate 27 by means of a pair of spaced opposed brackets 33, as shown in FIGS. 11 and 12. (FIG. 12 being an end view of routing apparatus 26 looking along the axis about which high speed cutter 25 rotates). Bracket 33 includes a flange 33A which lies flat against the outer surface of base plate 27, and is rigidly attached thereto by means of one or more screws such as 33B. Bracket 33 also includes a web member 33C attached at a 90 degree angle to flange 33A. Web 33A is rigidly attached at a 90 degree angle to first guide plate 31, thereby supporting guide plate 31 at a 45 degree angle with respect to the axis about which high speed cutter 25 rotates.

A second guide plate 37 has a flat guide surface 37A which slides along the outer surface of laminate layer 5. Guide plate 37 is attached by means of bracket 35 to base plate 27. Bracket 35 includes web plate 35C and perpendicular flange 35A, which is attached to base plate 27 by means of screw 35B.

Guide plates 41 and 37 are positioned so that high speed cutter 25 is positioned to cut an inlay groove which is symmetrically aligned along the edge of countertop 1.

Next, the apparatus and method for installing inlay strips, such as 11A and 11B, and aligning and beveling inclined edges, such as 15A and 15B (see FIG. 5), is described.

Referring first to FIG. 14, a jig 39 is disclosed having a base plate 41 and a clamping block 47 disposed on the rear upper surface of base plate 39. Jig 39 has an elongated groove 45 and is formed along the flat upper surface of base plate 41. The elongated groove 45 is identical in depth, width and configuration to the various above described inlay grooves. Groove 45 extends through opening 49 from pointed end 43 to the rear end of jig 39. A bottom ridge 53 is formed on the flat bottom surface of jig 39 and extends from pointed end 43 all the way to the rear edge of jig 39. Bottom ridge 53 is parallel to and in perfect alignment with groove 45. (See FIG. 15, which is a front view of jig 39.) Ridge 53 has the same width and depth as the above described inlay strips. Jig 39 includes a clamping screw 51 disposed in clamping block 47 for serving a section of inlay strip in groove 45. It should be noted that front side surfaces 43A and 43B of jib 39 are inclined at 45 degree angles with respect to the side edges of jig 39.

The method of using jig 39 to install corner inlay strips is best understood by referring to FIG. 13, which shows the countertop 5A of FIG. 5 with inlay strip 11A partially adhesively attached in its inlay groove. However, inlay strip 11A has a free end which is not adhesively attached in its inlay groove. The free end portion of inlay strip 11A extends from a point approximately 8 inches to the right of corner point 16.

The rear end of jig 39 is positioned so that the free end of inlay strip 11A extends through hole 49, and slides along groove 45 of jig 39 all the way to the pointed end 43 of jig 39. Clamping screw 51 is utilized to clamp inlay strip 11A into groove 45 after side surfaces 43A and 43B are aligned with edge 15C and 15B of inlay groove 9B.

Bottom ridge 53 (see FIG. 15) of jig 39, fits perfectly into beveled inlay groove 9B into which inlay strip 11A is being installed. The inclined front surfaces 43A and 43B are then perfectly aligned with lines 15A and 15B of the pointed end of beveled inlay groove 9B.

The next step in the operation of installing and cutting the pointed end of inlay strip 11A is best understood by first referring to routing apparatus 57, shown in FIGS. 16 and 17. Routing device 57 includes a small high speed router 57A, which can be anyone of a variety of commercially available devices. A jig 52 including guide plates 61 and 63 maintained in spaced parallel configuration by means of spacer 63B is attached to router motor 57A. A high speed cutter 59, which bevels leading edges 18A and 18B (FIG. 8) of inlay strip 11A, is attached to a drive chuck of router motor 57A and extends through aperture 58 of guide plate 61.

Guide plate 63 has a guide edge 63A, which slides along inclined side edges 43A and 43B of jig 39, as indicated by the dotted lines representing jig 39 in FIG. 16.

Routing device 57 is then deployed in the manner indicated in FIG. 16 to bevel edges 15A' and 15B' (FIG. 13), forming the completed inlay strip 11A, the free end of which is then adhesively attached in beveled inlay groove 9B. Leading edges 15A' and 15B' then are perfectly aligned with edges 15A and 15B of inlay groove 9B.

In the process of beveling leading edges 15A' and 15B' (FIG. 13), surface 61A of guide member 61 (FIG. 7) slides along the upper surface of base plate 41, and edge 63A of guide plate 63B slides along the inclined edges 43A and 43B.

FIG. 18 discloses more precisely the configuration of high speed cutter 59 of FIG. 17.

FIGS. 19 and 20 disclose a guide apparatus which can be utilized to replace guide plate 37 and bracket 35 of the routing device 26 of FIG. 11 to enable the device to easily cut inlay grooves along both straight edges of countertops and also around rounded corners.

When guide plate and bracket 35, 37 of FIG. 11 are removed and guide apparatus 60 of FIGS. 19 and 20 is connected in its plate, guide rollers 71 and 71' roll along the vertical surface of laminate layer 37, performing the same function as guide plate 37. The cylindrical surfaces of rollers 71 and 71' are inclined at a 45 degree angle with respect to base plate 27. The cylindrical surfaces of rollers 71 and 71' thus roll along the flat surface of vertical laminate layer 37. Rollers 71 and 71' are symmetrically disposed on opposite sides of the axis of rotation of high speed cutter 25.

Referring to FIG. 19, roller 71 is rotatably disposed by means of axle 75 between ears 73A and 73B of support 75. Axle 75 is attached to member 35', which is attached by means of a flange and screws (not shown) to base plate 27. Roller 71' is similarly mounted.

FIG. 21 discloses a high speed cutter 67 having inclined cutting edges 67C for beveling the edges of curved laminate strip 16 of FIG. 4. High speed cutter 67 has a freely rotatable "bevel wheel" 67A attached thereto by means of bearing pin 67B. Bevel wheel 67A rolls along a guide surface of a template 69 to which a piece of laminate material is maintained in fixed relationship during the beveling operation. Template 69 has a shape which corresponds to the shape of laminate strip 16 of FIG. 4, enabling high speed cutter 67, when attached to an appropriate routing machine (not shown) to bevel the edges of laminate strip 16 of FIG. 4.

The straight edged laminate inlay strips described above can be formed in a variety of ways by those skilled in the art. For example, cutter 67 of FIG. 21 can be used in conjunction with suitable straight edged templates to bevel the parallel edges of the straight edged laminate inlay strips. Alternatively, a single high speed cutter blade having a cutting edge complementary to the cross-section of the inlay strips (see FIG. 6), can be utilized.

While the invention has been described with reference to several particular embodiments thereof, those skilled in the art will be able to make obvious variations in the disclosed structure and methods without departing from the true spirit and scope of the invention as set forth in the appended claims.

I claim:
1. A countertop structure comprising in combination:
   a. a substrate, said substrate having a horizontal flat upper surface and a substantially vertical edge surface;
   b. a first laminate layer adhesively attached to the upper surface of said substrate;
   c. a second laminate layer adhesively attached to the substantially vertical surface of said substrate;
   d. a first beveled inlay groove in said countertop structure, the bottom surface of said beveled inlay groove being of uniform width, said first beveled inlay groove being disposed between adjacent edges of said first and second laminate layers, said first beveled inlay groove having two opposed side walls at least partially formed by said adjacent edges of said first and second laminate layers, said side walls of said first beveled inlay groove each being sloped outward from the bottom surface of said first beveled inlay groove so that the width of the top portion of said first beveled inlay groove is greater than the width of the bottom surface thereof;
   e. a first inlay strip disposed in and substantially coextensive with said first beveled inlay groove, said first inlay strip having a thickness substantially equal to the depth of said first beveled inlay groove, said first beveled inlay strip having two opposed side walls and an inner surface and outer surface, said side walls of said first beveled inlay strip each being sloped so that the width of the outer surface of said first inlay strip is substantially equal to the width of the top portion of said first beveled inlay groove and the width of the inner surface of said first inlay strip is substantially equal to the width of the bottom surface of said first beveled inlay groove, so that the side walls of said first inlay strip closely adjoin the two side walls of said first beveled inlay grooves, respectively; and
   f. adhesive means disposed between said first beveled inlay groove and said first inlay strip.

2. The countertop structure of claim 1 wherein said first inlay strip is composed of laminate material of substantially the same thickness as said first and second laminate layers.

3. The countertop structure of claim 1 wherein said first beveled inlay groove and said first inlay strip are rounded and extend around a rounded corner of said countertop structure.

4. The countertop structure of claim 1 wherein said countertop structure includes a non-rounded corner, said countertop structure further including a second beveled inlay groove which is perpendicular to said first inlay groove, and a third beveled inlay groove which is perpendicular to said first and second beveled inlay grooves, said first, second and third beveled inlay grooves meeting at a first common point, said countertop structure further including second and third inlay grooves disposed in and substantially coextensive with second and third beveled inlay grooves, respectively.

5. The countertop structure of claim 1 wherein said substrate is composed of wooden material.

6. The countertop structure of claim 1 wherein said side walls of said first inlay groove are beveled and wherein each beveled side wall makes a 45 degree angle with the bottom of said first inlay groove.

* * * * *